M. L. NIX, J. M. STONE, & L. ANDERSON.
Cotton-Seed Planter.
No. 200,750.    Patented Feb. 26, 1878.
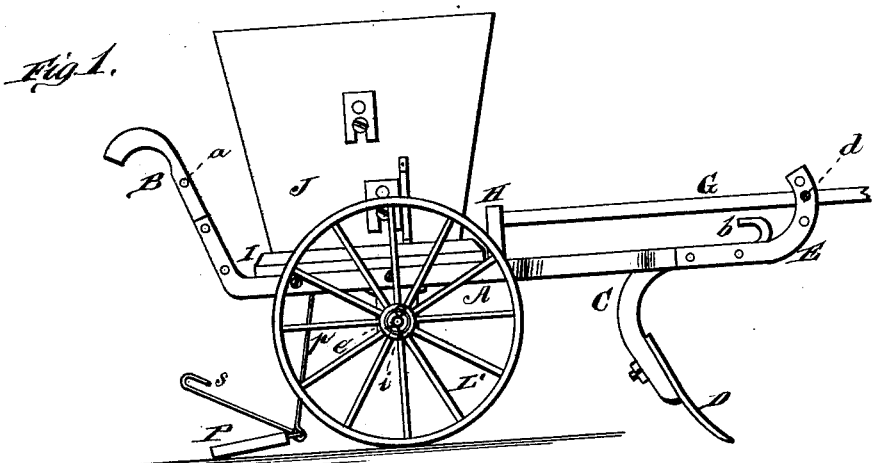
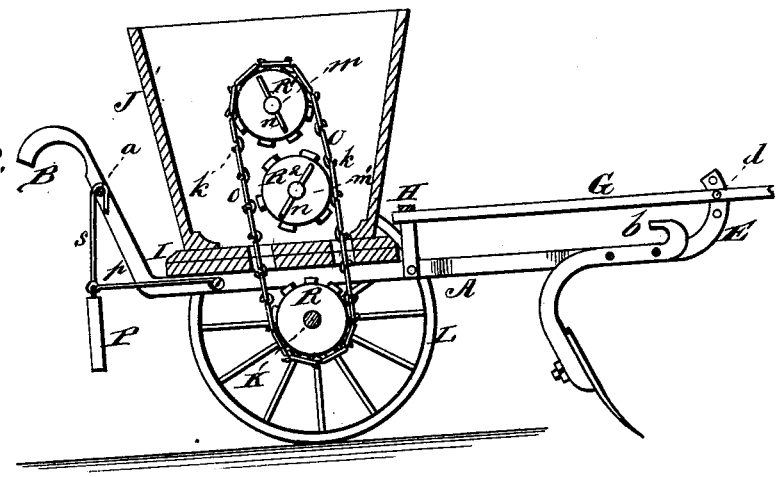
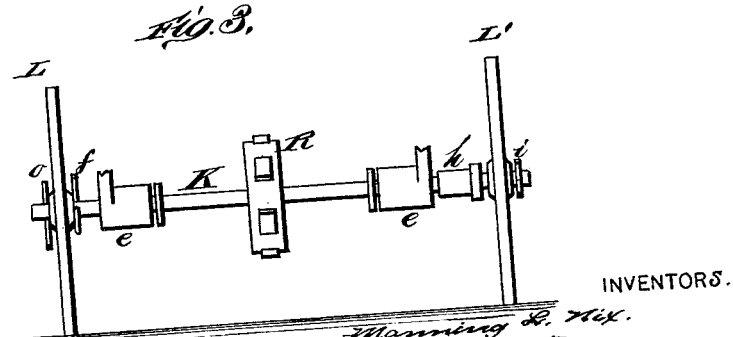

UNITED STATES PATENT OFFICE.

MANNING L. NIX, JAMES M. STONE, AND LEVI ANDERSON, OF PARIS, TEXAS.

IMPROVEMENT IN COTTON-SEED PLANTERS.

Specification forming part of Letters Patent No. 200,750, dated February 26, 1878; application filed January 5, 1878.

*To all whom it may concern:*

Be it known that we, MANNING L. NIX, JAMES M. STONE, and LEVI ANDERSON, of Paris, in the county of Lamar and State of Texas, have invented a new and valuable Improvement in Cotton-Seed Planters; and we do hereby declare that the following is a full, clear, and exact description of the construction and operation of the same, reference being had to the annexed drawings, making a part of this specification, and to the letters and figures of reference marked thereon.

Figure 1 of the drawings is a side view of our cotton-seed planter. Fig. 2 is a longitudinal vertical section; and Fig. 3 is a rear view, with hopper removed.

This invention relates to cotton-seed planters; and our improvements consist in the construction and arrangement of the parts, as will be hereinafter more fully described, and pointed out in the claims.

The annexed drawings, to which reference is made, fully illustrate our invention.

The frame-work of our planter is composed of two parallel metallic side bars, A A, having their rear ends turned upward at an angle, and the handles B B secured to said turned-up parts, these handles being connected by a round or cross-bar, *a*.

The front portions of the side bars A A are curved or bent inward toward the center, and forward, and the extreme front ends running parallel to each other and secured one on each side of the plow-beam C. This plow-beam is also of metal, and its rear end curved downward and forward in the usual manner, and the plow D secured to it.

The front end of the plow-beam C is curved upward, and forms a hook, *b*, for the attachment of the double-tree.

On the outer side of the front end of each bar A is attached a short bar, E, said bars E E, bars A A, and plow-beam C being all fastened together by bolts or other suitable means. The front ends of the bars E E are turned upward on a curve, and between them is adjustably held the tongue G, by means of a pin, *d*, passing through them, as shown. The tongue G extends backward, and its rear end is attached to an arched brace, H, connecting the side bars A A at or near the point where the same turn inward. On the side bars A A is secured a platform, I, upon which the hopper J is supported.

In boxes *e e*, on the under sides of the side bars A A, is placed the axle K, having the wheels L L' upon its ends. The wheel L is intended to be keyed fast on the axle, so as to turn the axle with it when the machine is in motion; but said wheel can be adjusted out and in upon the axle, there being for that purpose two holes through the axle and two spring-keys, *f*, passing through the same. The other wheel, L', is loose upon the axle, and is shown with a spring-key, *i*, through the axle on the outside of the wheel, and an elongated washer, *h*, inside of the wheel, between it and the box *e*. This washer may be placed outside of the wheel. Thus the two wheels can be adjusted out or in upon the ends of the axle, so as to regulate the machine according to the width between the rows of cotton.

In the center of the axle K is secured a sprocket-wheel, R, by which motion is communicated to an endless chain, composed of a series of links, O O. These links are made in rectangular form, and at one end of each link is formed a curved lip, *k*, which is passed around the cross-bar at the opposite end of the adjoining link, and then hammered down to form the connection between the links. The chain thus constructed is passed around the wheel R and up through slots in the platform I, and around a sprocket-wheel, $R^1$, upon a shaft, *m*, in the upper part of the hopper J.

Below the shaft *m* is another shaft, *m'*, upon which is secured a sprocket-wheel, $R^2$, this wheel receiving its motion by the chain O, as shown.

The shafts *m* and *m'* have their bearings in the sides of the hopper J, or in suitable boxings fastened in the hopper; and said shafts are provided with suitable arms *n n*, projecting radially from them. These arms act as agitators or stirrers in the seed, and the chain carries the seed down regularly through the platform in rear of the plow.

The seed is covered by means of a drag, P, suspended by means of rods *p p*, as shown. The drag P is provided with a hook, *s*, for suspending the same from the rod *a* when not in use.

What we claim as new, and desire to secure by Letters Patent, is—

1. The combination of the axle K with sprocket-wheel R, endless chain O, and shaft $m$, with sprocket-wheel R within the hopper, and stirrers $n$, substantially as and for the purpose set forth.

2. The shaft $m'$, with stirrers $n$ and sprocket-wheels $R^1$ and $R^2$, in combination with the endless chain O and sprocket-wheel R, substantially as and for the purpose set forth.

In testimony that we claim the above we have hereunto subscribed our names in the presence of two witnesses.

MANNING LAFAYETTE NIX.
JAMES MANSFIELD STONE.
LEVI ANDERSON.

Witnesses:
 M. L. CRENSHAW,
 J. M. MARTIN.